(12) United States Patent
Monjas Llorente et al.

(10) Patent No.: US 8,595,494 B2
(45) Date of Patent: Nov. 26, 2013

(54) METHOD FOR MANAGING ACCESS TO PROTECTED RESOURCES IN A COMPUTER NETWORK, PHYSICAL ENTITIES AND COMPUTER PROGRAMS THEREFOR

(75) Inventors: Miguel Angel Monjas Llorente, Madrid (ES); José Maria Del Álamo Ramiro, Alcorcon (ES); Juan Carlos Yelmo García, Móstoles (ES)

(73) Assignees: Telefonaktiebolaget LM Ericsson, Stockholm (SE); Universidad Politecnica de Madrid, Madrid (ES)

( * ) Notice: Subject to any disclaimer, the term of this patent is extended or adjusted under 35 U.S.C. 154(b) by 0 days.

(21) Appl. No.: 13/501,582

(22) PCT Filed: Oct. 22, 2009

(86) PCT No.: PCT/EP2009/063891
§ 371 (c)(1),
(2), (4) Date: Apr. 12, 2012

(87) PCT Pub. No.: WO2011/047722
PCT Pub. Date: Apr. 28, 2011

(65) Prior Publication Data
US 2012/0204221 A1   Aug. 9, 2012

(51) Int. Cl.
 *H04L 29/06* (2006.01)
 *H04L 9/32* (2006.01)
 *G06F 17/00* (2006.01)
 *G06F 7/04* (2006.01)
(52) U.S. Cl.
USPC .......... 713/168; 713/159; 713/172; 713/182; 726/1; 726/10

(58) Field of Classification Search
USPC ................ 713/159, 168, 172, 182; 726/1, 10
See application file for complete search history.

(56) References Cited

U.S. PATENT DOCUMENTS

| 6,253,202 | B1 | 6/2001 | Gilmour |
| 7,076,558 | B1 | 7/2006 | Dunn |
| 7,334,254 | B1 * | 2/2008 | Boydstun et al. ................. 726/2 |
| 8,132,242 | B1 * | 3/2012 | Wu .................................. 726/8 |
| 2002/0046352 | A1 | 4/2002 | Ludwig |
| 2003/0084300 | A1 | 5/2003 | Koike |

OTHER PUBLICATIONS

Eran Hammer-Lahav, "Explaining OAuth," http://hueniverse.com/2007/09/explaining-oauth/ Sep. 5, 2007.
Atwood, M. et al., "OAuth Core 1.0 Revision A," http://oauth.net/core/1.0a Jun. 24, 2009.

(Continued)

*Primary Examiner* — Mohammad W Reza
(74) *Attorney, Agent, or Firm* — Nixon & Vanderhye PC

(57) ABSTRACT

A method carried out by a controller is disclosed. The method includes receiving (s10) a message including a request token. A request token is a value used by a consumer (300) to request authorization from a user to access protected resources from a service provider (400). A service provider (400) is at least one of a software application and web site that is configured to provide access to protected resources. A consumer {300} is at least one of a software application and a web site that is configured to access a service provider (400) on behalf of a user. The method further includes determining (s20) whether the message meets policy settings governing the access to protected resources; and, if it is determined (s30) that the message does not meet the policy settings, preventing (s34) the request token from being forwarded to the service provider (400) associated with the request token.

16 Claims, 8 Drawing Sheets

(56) References Cited

OTHER PUBLICATIONS

Eran Hammer-Lahav, "Beginner's Guide to OAuth—Part II: Protocol Workflow," http://hueniverse.com/2007/10/beginners-guide-to-oauth-part-ii-protocol-workflow/ Oct. 15, 2007.
International Search Report for PCT/EP2009/063891 mailed Mar. 23, 2010.
International Preliminary Report on Patentability Jan. 16, 2012.
T. Jose, OAuth Project Review, XP-002570264, Jan. 29, 2009, 15 pages.
W. Bin et a., "Open Identity Management Framework for SaaS Ecosystem", E-Business Engineering, 2009, International Conference on e-Business Engineering, Oct. 21, 2009, pp. 512-517.
Hammer-Lahav et al., "The OAuth Protocol: Web Delegation; draft-ietf-oauth-delegation-01.txt", Network Working Group—Internet Draft, Vol. oauth, No. 1, Jul. 6, 2009, 19 pages.
Vrancken Z Zeltsan Alcatel-Lucent B: "Using OAuth for Recursive Delegation; draft-vrancken-oauth-redelegation-00.txt", OAuth WG—Internet Draft, Sep. 1, 2009, 12 pages.
International Search Report for PCT/EP2010/052319, four pages, mailed Feb. 3, 2011.
International Preliminary Report on Patentability for PCT/EP2010/052319, five pages, mailed Feb. 16, 2012.
Written Opinion for PCT/EP2010/052319, five pages, mailed Feb. 3, 2011.
Office Action for U.S. Appl. No. 13/579,643, mailed Jun. 20, 2013.

* cited by examiner

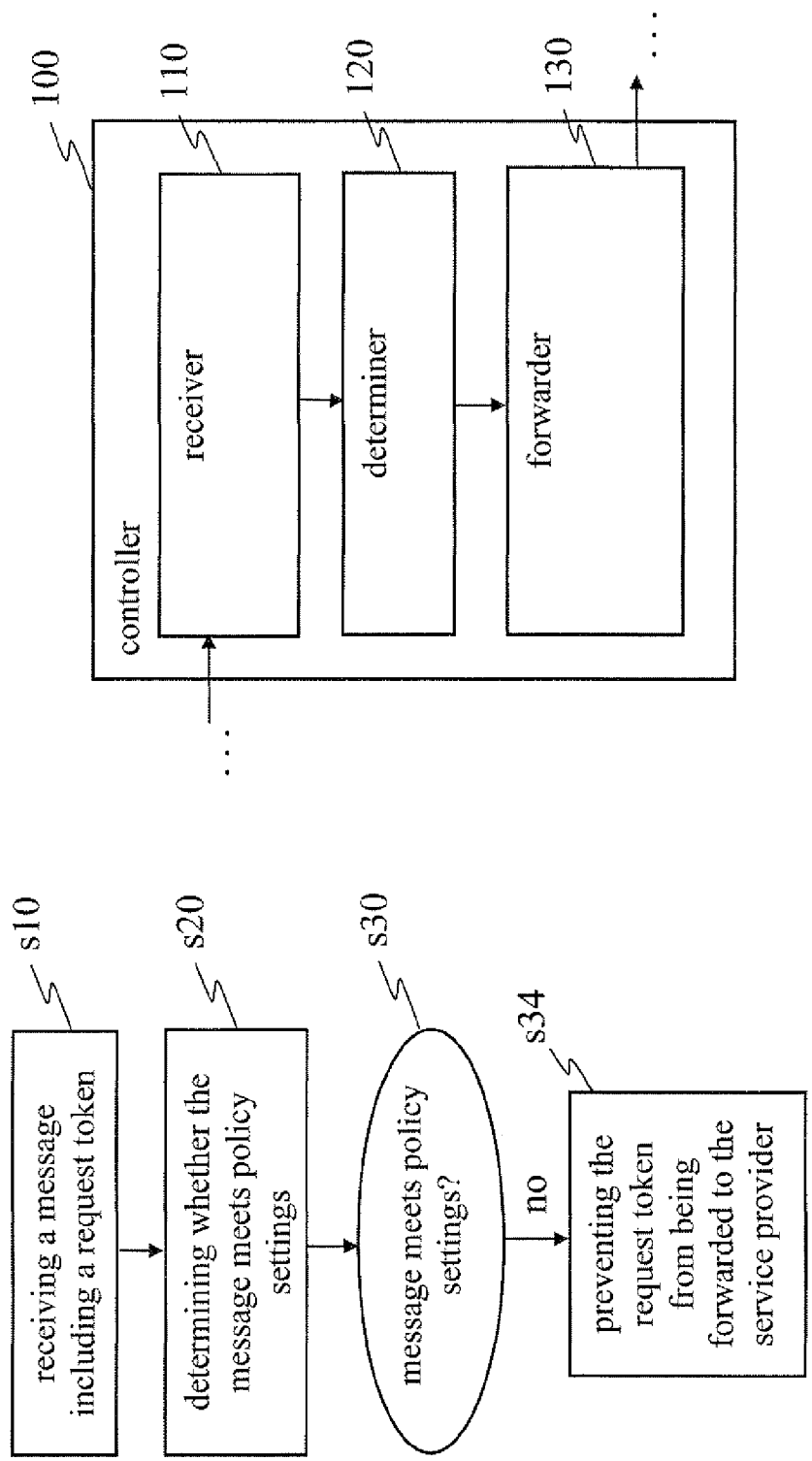

METHOD FOR MANAGING ACCESS TO PROTECTED RESOURCES IN A COMPUTER NETWORK, PHYSICAL ENTITIES AND COMPUTER PROGRAMS THEREFOR

This application is the U.S. national phase of International Application No. PCT/EP2009/063891 filed 22 Oct. 2009, which designated the U.S., the entire contents is hereby incorporated by reference.

TECHNICAL FIELD

The present invention relates to the management of access to protected resources in a computer or communications network, and the use of such resources. In particular, the invention relates to methods carried out by physical entities for performing such access management, and to physical entities configured therefor. The invention also relates to computer programs comprising instructions configured, when executed on a computer, to cause the computer to carry out the above-mentioned methods. The invention may notably be applied in the context of web services using resources associated with a user in a computer network, wherein the resources are scattered on two or more web applications or web sites.

BACKGROUND

In computer or communications networks, different web sites or web applications may provide different services for the benefit of a user. For instance, one web site or web application may manage an email account of the user. Another web site or web application may enable the storage of photos for sharing them to members of a social network of the user. Yet another web site or web application may act as a bookshop managing a user's bookshop account. Yet a further web site or web application may offer to print images and photos and deliver them to users. The possibilities are endless.

Yet, web sites and web applications may want to offer new services "which tie together functionality from other sites" (Eran Hammer-Lahav, "Explaining OAuth", Sep. 5, 2007, http://hueniverse.com/2007/09/explaining-oauth/—retrieved on Sep. 15, 2009, here referred to as ref. [1]). For instance, a digital photo lab printing web application (such as an exemplary web site "printer.consumer.com") may want to retrieve, on behalf of a user, photos stored in a digital image hosting web site (such as an exemplary site "photos.container.com") with which the user has an account, in order to print and deliver these photos to the user.

In order to implement a web service integrating protected resources from different web sites and web applications, a first web site or web application, here referred to as the "consumer", may request the user to provide his or her credentials to access a second web site or web application, here referred to as the "service provider" (although the consumer also provides services). In the above-mentioned example, the consumer would be the digital photo lab printing web application, the service provider would be the digital image hosting web site, and the protected resources would be the user's private photos. In other words, the consumer may request the user to provide his or her username and password to access the service provider. This, however, exposes the user's password and enables the password to be used by someone else for any actions associated with the user's account within the service provider (such as "even change your password and lock you out", ref. [1], section "What is it For").

To solve that problem, the OAuth protocol has been developed (Atwood, M. et al, "OAuth Core 1.0 Revision A", Jun. 24, 2009, http://oauth.net/core/1.0a—retrieved on Sep. 15, 2009, here referred to as ref. [2]). The OAuth protocol enables a web site or web application, i.e. the consumer, to access protected resources from another web site or web application, i.e. the service provider, without requiring the users to disclose their service provider credentials to the consumers (ref. [2], Abstract). The OAuth protocol may be viewed as an application programming interface (API) access delegation protocol. The valet key analogy, explained in ref. [1], section "What is it For", may help to intuitively understand the purpose of the OAuth protocol.

In the OAuth protocol, the authentication, i.e. "the process in which users grant access to their protected resources without sharing their credentials with the consumer" (ref. [2], "6. Authenticating with OAuth"), works as follows.

The consumer obtains an unauthorized request token from the service provider. The consumer directs the user to the service provider via the user's web browser, using the service provider's user authorization URL ("URL" stands here for "Uniform Resource Locator"). The user then authenticates him- or herself with the service provider. In other words, the user signs into the service provider's web site. At no time the user provides his or her service provider credentials to the consumer.

The service provider then asks the user whether he or she agrees with the consumer being granted access to the protected resources. To do so, the service provider presents, to the user, information about the protected resources to which the consumer wants to access. The information includes the duration of requested access and the type of access (e.g. copy, modify, or delete a protected resource). The information may for instance be presented on a web page of the service provider web site with an exemplary message such as "The web site <consumer-name> is requesting access to your private photos for the next 1 hour. Do you approve such access?" The user then grants or denies permission for the service provider to give to the consumer the envisaged access on behalf of the user.

If the user agrees, the request token is authorized and the user is directed back to the consumer, so that the consumer is notified that the request token has been authorized. The authorized request token is then exchanged for an access token and the protected resources can be accessed by the consumer on behalf of the user. If the user denies permission, the consumer is notified that the request token has been revoked.

An example of authentication process using the OAuth protocol is presented in Eran Hammer-Lahav, "Beginner's Guide to OAuth—Part II: Protocol Workflow", Oct. 15, 2007, http://hueniverse.com/2007/10/beginners-guide-to-oauth-part-ii-protocol-workflow/—retrieved on Sep. 15, 2009.

It is desirable to improve the methods, physical entities and computer programs to manage access, on behalf of users, by web sites or web applications, referred to here as consumers, to protected resources associated with the users on other web sites or web applications, referred to here as service providers, with in mind the need of reducing the operational burden on the users.

SUMMARY

To meet or to at least partially meet these objectives, methods, controllers and computer programs are defined in the independent claims. Advantageous embodiments are defined in the dependent claims.

In one embodiment, a method carried out by a controller is provided. The method includes a step of receiving a message including a request token. A request token is a value used by a consumer to request authorization from a user to access protected resources from a service provider. A service provider is at least one of a software application and a website that is configured to provide access to protected resources. A consumer is at least one of a software application and a website that is configured to access a service provider on behalf of a user. The method further includes a step of determining whether the message meets policy settings governing the access to protected resources, and a step of, if it is determined that the message does not meet the policy settings, preventing the request token for being forwarded to the service provider associated with the request token.

The controller is a physical entity, which may include a computer program or hardware circuitry for executing the functions of the controller. The controller may for instance be integrated with a server computer or with a user terminal. The controller is configured to receive a message including a request token, and then to check whether the message meets the policy settings. If the message does not meet the policy settings, the request token is prevented from being forwarded towards the service provider. As a result, a user is not unnecessarily directed to the authorization page of the service provider, where the user would otherwise be asked to decide whether to grant or deny access to protected resources accessible from the service provider.

Policy settings, or policy rules, governing the access to protected resources are preemptively established for enforcement by the controller which denies access to protected resources if the message does not meet the policy settings. When a message does not meet the policy settings, the access denial is enforced by the controller without the need for the user to intervene at the time when the message is received.

In other words, the controller intercepts messages including a request token and, depending on the type of authorization request associated to the message and its request token, the controller decides whether to interrupt the authentication and authorization process. The controller prevents the request token from being forwarded, and thus interrupts the authentication and authorization process, based on information extracted or gathered from the message regarding what would or could happen if the request token was authorized.

This relieves the user from having to interact, at the time when the message is received, with the service provider in some cases, namely in the cases wherein the controller determines that a message does not meet the policy settings.

Thus, the method improves and facilitates, notably by reducing the operational burden on the users, privacy management in computer or communication networks. Privacy management, from a user's perspective, is the task consisting in controlling, by the user or to the benefit of the user, which protected resource stored on, provided by or accessible from a service provider and associated with the user can or cannot be accessed by a given consumer, and how. The privacy management also includes the proper handling of the users' protected resources, consistent with the preferences of the user, for instance regarding the operations which can be performed in relation to the protected resources of a user.

Besides reducing the operational burden on users, this embodiment also reduces the risk of a human error that would involve a user unintentionally granting access to some protected resources.

A message is a unit or units of information capable of being transmitted over a communication channel or over a network and capable of carrying a request token and associated parameters, if any. The message may also be called a request.

A user is a human or a group of humans whose identity can be authenticated, or a physical entity, such as a user terminal or user equipment, which identity can be authenticated. In other words, when the term "user" is used here, it may refer to either or both the actual end user(s), i.e. the human or group of humans, or the user's terminal or user's equipment to which an identity may be attached. Moreover, if a user terminal is capable to operate using several identities (e.g. associated with different user profiles), each identity under which the user terminal may operate may correspond to one user in the context of the invention.

Thus, the term "user" also encompasses here, where appropriate, the user's equipment or user's terminal. For instance, regarding authentication, the user's equipment may be well arranged to carry out the authentication procedure without human intervention. This is notably why the term user generally refers to either or both the user as a human being, or group of human beings, and the user's equipment in use by a certain human being.

A protected resource is either data related to a user's identity of a user or group of identities associated with a group of users, or a service associated with an identity of a user or group of identities associated with a group of users. Examples of protected resources include private photos, contacts in an online address book, lists of friends in an online social network, lists of bookmarks, lists of favourite songs stored in an online social network account, lists of goods recently purchased from an online store, the possibility to save or publish data on a server or blog, etc. A protected resource may include protected social information.

The access to or use of a protected resource may, as mentioned above, consist in the use of a service. In that context, the provision of a service is a technical and economical activity which may for instance result in the ownership of physical goods through a sale, modification of the technical characteristics of a computer configuration, etc. The service may be a web service.

The invention may be used with web-based social network services, but is not limited thereto. Likewise, the invention may use the OAuth protocol or a protocol derived from the OAuth protocol but is not limited thereto. The invention may be used in other contexts and with other protocols.

In one embodiment, the method further includes the step of, if it is determined that the message meets the policy settings, allowing the request token to be forwarded to the service provider associated with the request token. That is, the controller does not maintain other barriers against the forwarding of the request token.

In a sub-embodiment of this embodiment, the request token is then directly forwarded, by the controller, to the service provider.

In an alternative sub-embodiment of this embodiment, the request token is then forwarded to an intermediate physical entity from which the request token may then be forwarded to the service provider associated with the request token. Such an intermediate physical entity or computer program may be a user terminal or a browser running on a user terminal. The intermediate physical entity or computer program may also itself act as a controller. This provides a two-step or multi-step determining process, with different policy settings enforced on each of the two controllers or plurality of controllers.

In one embodiment, the controller prevents the request token from being forwarded and thus causes the authentication and authorization process to be interrupted based on information extracted or gathered from the message regarding at least one of: which consumer would access or use protected resources if the request token was authorized, which protected resources would be accessed or used if the request token was authorized, and how the protected resources would be used if the request token was authorized.

In one embodiment, the step of determining whether the message meets policy settings includes a sub-step of extracting and a sub-step of determining. The sub-step of extracting includes extracting from the message at least one of: information about the consumer from which the request token originates; information about the protected resources on which one or more operations are requested to be authorized by means of the request token; and information about the one or more operations which are requested to be authorized by means of the request token. The determining sub-step includes determining whether the information extracted in the extracting sub-step meets the policy settings.

This embodiment enables effective control, by the controller, of the significance of a request token in terms of privacy management to the extent that this can be deduced from the message including the request token. If the information extracted from the message does not meet the policy settings, the request token is prevented from being forwarded to the service provider.

The interception and examination, by the controller, of the message including the request token may relate to features or identity of the consumer from which the request token originates, wherein some consumers or types or groups of consumers may be considered as unreliable.

Provided that information about the protected resource(s) on which one or more operations are requested to be authorized by means of the request token can be obtained or extracted from the message (either because the message includes a parameter identifying such protected resources or because it is possible from one or more characteristics of the message to derive an identification of the protected resources or type of protected resources associated with the request token), the intermediate interception and examination of the message may include extracting such information about the protected resource(s). If the message corresponds to an authorization request in relation to a particular protected resource or type of protected resources, such as sensitive information (e.g., bank details), the request token may for instance be prevented from being forwarded to the service provider.

In one embodiment, information about the protected resource(s) on which one or more operations are requested to be authorized by means of the request token can be obtained or extracted from the message.

Provided that information about the one or more operations which are requested to be authorized by means of the request token can be obtained or extracted from the message, the step of intercepting and checking the message may include determining whether such characteristics of the operations requested to be authorized meet the policy settings.

In one embodiment, information about operations which are requested to be authorized by means of the request token can be obtained or extracted from the message.

In one embodiment, the method further includes a step of obtaining, from at least one service provider, information regarding the protected resources associated to a user's identity in the at least one service provider. This enables a user to obtain a view of the protected resources that are accessible from a service provider. This enables proper privacy management to be carried out.

In a sub-embodiment of this embodiment, the information that the controller can obtain regarding the protected resources associated to a user's identity in the at least one service provider includes information regarding the usage of the protected resources associated to a user's identity in the at least one service provider.

This embodiment enables the users to obtain, through the controller, a dynamic view of the protected resources associated with their identity. The controller thus acts as a central point of control in that respect.

The obtainable view may be dynamic in the sense that the users can obtain information on how and when, i.e. when during at least a period of time, the protected resources have been used by which consumers. The users can thus collect information about the usage of their protected resources. The users may then decide whether to modify the policy settings in the controller based on this knowledge. The usage history retrieval may be performed by the controller upon receiving an express request from a user. Alternatively, the controller may be configured, either based on an initial interaction with a user or based on default settings, to retrieve the usage history of the protected resources associated with the user's identity.

An identity, and more specifically a user's identity, is one of the characteristics of the user which identifies it or which is mapped in some way to the user to identify it.

The usage information may notably include information about one or more of: the type of a protected resource, timestamps of access to the protected resources, and identifiers of consumers which access, have accessed, use, or have used the identity resource.

In one embodiment, the method further includes recording information, here referred to as history information, regarding at least one of: received messages and whether their request tokens have been prevented from being forwarded; received request tokens and whether they have been prevented from being forwarded; received messages and whether their request tokens have been allowed to be forwarded; and received request tokens and whether they have been allowed to be forwarded. The method then includes a step of making available the history information to a user terminal.

In one embodiment, the method is additionally carried out by a user terminal capable of communicating with the controller, and the method further includes setting, by the user terminal, the policy settings in the controller.

The invention also relates to a controller including a receiver configured for receiving a message including a request token. As mentioned above, a request token is a value used by a consumer to request authorization from a user to access protected resources from a service provider. A service provider is at least one of a software application and a web site that is configured to provide access to protected resources. A consumer is at least one of a software application and a web site that is configured to access a service provider on behalf of a user. The controller also includes a determiner configured for determining whether the message meets policy settings governing the access to protected resources; and a forwarder configured for, if it is determined that the message does not meet the policy settings, preventing the request token from being forwarded to the service provider associated with the request token.

The invention also relates to a computer program including instructions configured, when executed on a computer or the above-described controller, to cause the computer or the controller respectively to carry out the above-described method. The invention also relates to a computer program product or computer-readable medium including such a computer program.

BRIEF DESCRIPTION OF THE DRAWINGS

Embodiments of the present invention shall now be described, in conjunction with the appended figures, in which:

FIG. 1 is a flowchart of a method in one embodiment of the invention;

FIG. 2 schematically illustrates a controller, and some of its constituent elements, in one embodiment of the invention;

DESCRIPTION OF SOME EMBODIMENTS

Figure 4:
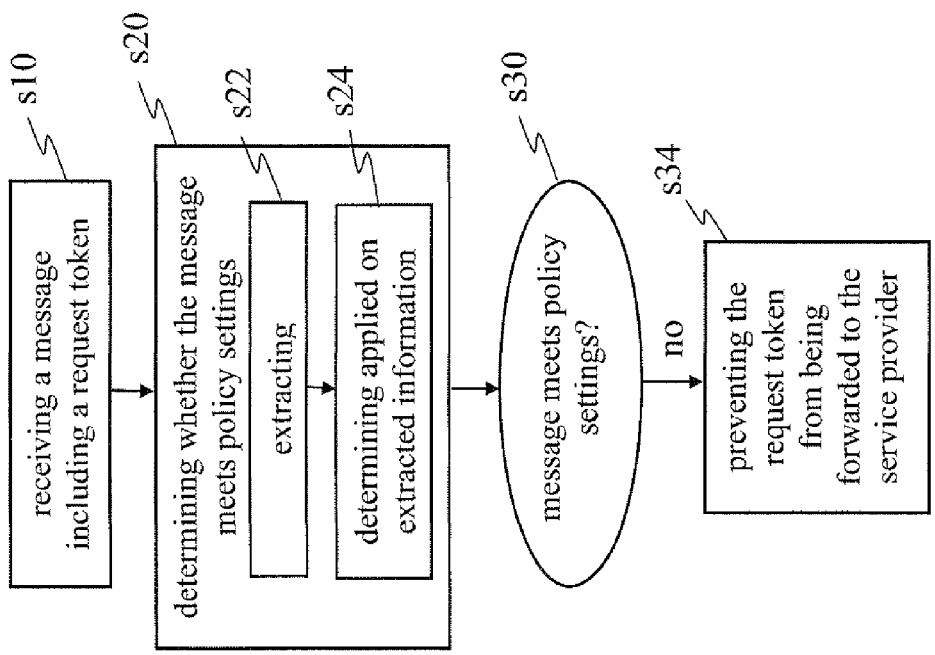
FIG. 4 is a flowchart of a method in one embodiment of the invention, wherein the step of determining whether the message meets policy settings governing the access to protected resources includes sub-steps of extracting information from the message and determining whether the extracted information meets policy settings.

The present invention shall now be described in conjunction with specific embodiments. It may be noted that these specific embodiments serve to provide the skilled person with a better understanding, but are not intended to in any way restrict the scope of the invention, which is defined by the appended claims.

FIG. 1 is a flowchart of a method in one embodiment of the invention. The method illustrated in FIG. 1 is carried out by a controller 100.

First, the controller 100 receives, in step s10, a message including a request token. The message originates from a consumer 300 which seeks to access protected resources accessible from a service provider 400. In that context, the request token is a value which identifies the request for accessing the protected resources. The message may include, in addition to the request token, various additional information or parameters to accompany the request token, such as an identification of the consumer 300 from which the request token originates, the protected resources which are the subject of the authorization request initiated by the consumer 300, and/or the operations that are requested to be authorized by the consumer 300 in relation to the protected resources.

The message including the request token may come from another physical entity than the consumer 300 which has generated the request token. That is, between the consumer 300 and the controller 100, there may be intermediary physical entities through which the message and its request token are forwarded.

The message may be a packet, a HTTP request or any other suitable formatted signal to carry the request token.

Then, the controller 100 determines, in step s20, whether the received message complies with policy settings governing access to protected resources.

The policy settings are stored on the controller 100 or are accessible by the controller 100, and relate to the protected resources associated with the user on behalf of whom the controller 100 works. The policy settings may be set by the user, as it will be illustrated in FIG. 10. Alternatively or additionally, the privacy settings may be set by default when starting the controller 100. Updating the privacy settings may be carried out by the user, by a third party remotely authorized to configure the controller 100, or by both.

For instance, a user may set in advance the policy settings to be used by the controller 100 to indicate that first particular consumers 300, e.g. "doesntcareaboutprivacy.com" and "sellsyourprivatedatato3rdparties.com", are not authorized to access any of the user's protected resources, whatever the resources and the operations to be performed on the resources. The user may also indicate that request tokens found in messages from another particular consumer 300, e.g. "caresaboutprivacy.com", should only be prevented from being forwarded if the protected resources are for instance bank details or social security numbers, whatever the operations to be performed on the resources, or if the operations requested to be authorized consist in the deletion of some protected resources.

As a result of step s20, if the message does not meet policy settings (step s30), the message is prevented, in step s34, from being forwarded to the service provider 400. The prevention of forwarding may for instance be carried out by deleting the message, logging the particulars of the message in the controller 100 for later assessment, and informing the consumer 300 about the interception and non-forwarding of the message. The information sent to the consumer 300 may include details about why the message including the request token has been prevented from being forwarded by the controller 100.

The method provides end users with a user-friendly and efficient solution for managing privacy aspects of their protected resources scattered in a plurality of network entities. At the same time, the method minimizes implementation impacts. Users need not go through every single service provider that stores protected resources about them in order to set limits to the use of their protected resources they want to permit. Additionally, users are less often bothered and asked to grant or deny an authorization request by a consumer to access protected resources.

If, in step s30, it is determined that the message meets policy settings governing the access to protected resources, the message may or may not be prevented from being forwarded. For instance, if the controller 100 also acts as a firewall, the controller 100 may decide to block the message for other reasons. This may be because the message includes some attached ".exe" file which is unrelated to any policy settings governing the access to protected resources.

There may be other reasons for a controller 100 to prevent a message from being forwarded to the service provider 400, i.e. other reasons which are not based on policy settings governing the access to protected resources. Another exemplary reason may be that the controller 100 is integrated in a web browser, and the browser does not allow the message to be forwarded because HTTP redirection is not enabled/allowed on the browser (this possibility is mentioned in ref. [2], section 6.2.1).

If, in step s30, it is determined that the message meets policy settings governing the access to protected resources and, subsequently, the message is not prevented from being forwarded to the service provider 400, this may result in the message being directly forwarded to the service provider 400. Alternatively, the message may be forwarded to another physical entity entitled to carry out another decision process before the message is eventually forwarded to the service provider 400. A situation wherein this may occur will be described with reference to FIG. 6a.

In one embodiment, a message containing more than one request token is involved in the authorization process initiated by a consumer 300. The message is checked against the policy settings and the message may be modified by the controller 100 to prevent only the request tokens that do not meet the policy settings from being forwarded to the service provider 400.

FIG. 2 schematically illustrates a controller 100, and some of its constituent elements, in one embodiment of the invention. The controller 100 includes a receiver 110 configured for receiving a message including a request token. The controller 100 further includes a determiner 120 configured for determining whether the message meets policy settings governing the access to protected resources. The policy settings may be stored in the controller 100 or may be stored in a database or memory unit accessible by the controller 100. If the controller 100 determines that the message does not comply with the policy settings, the forwarder 130 is in charge of preventing the message from being forwarded to the service provider 400.

Figure 3:
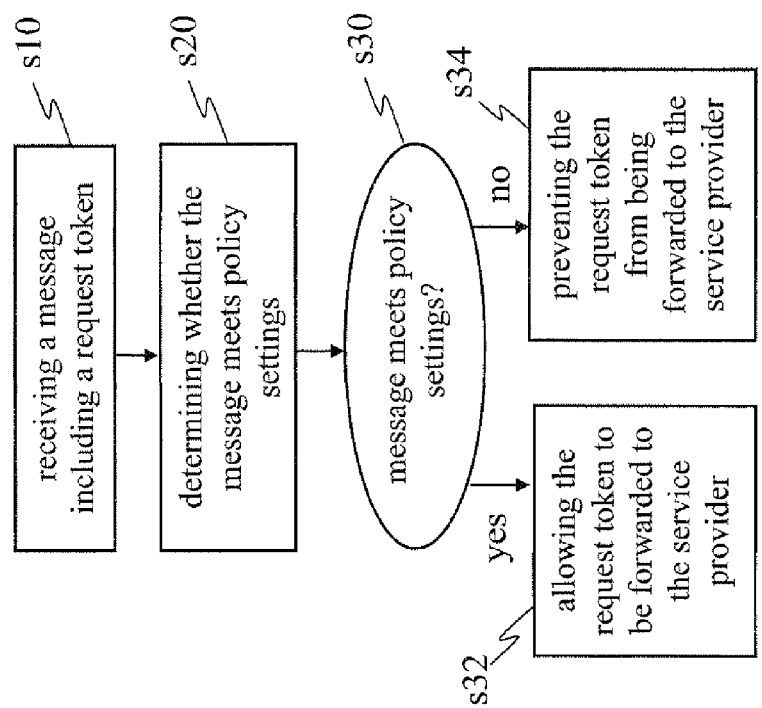
FIG. 3 is a flowchart of a method in another embodiment of the invention.

FIG. 3 is a flowchart of a method in one embodiment of the invention. In addition to the steps depicted in the flowchart of FIG. 1, the method illustrated on FIG. 3 includes a step s32 of allowing the request token to be forwarded to the service provider 400. This step s32 takes place when it is determined in step s30 that the message meets the policy settings. In other words, the controller 100 carrying out the method illustrated in FIG. 3 only prevents a request token from being forwarded to the service provider 400 associated with the request token if the message is determined not to comply with the policy settings.

FIG. 4 is a flowchart of a method in one embodiment of the invention. In addition to the steps depicted in the flowchart of FIG. 1, step s20 of determining whether the message meets policy settings governing the access to protected resources includes two sub-steps. The first sub-step s22 consists in extracting from the message at least one of:
(i) information about the consumer 300 which could access protected resources if the request token was authorized,
(ii) information about the protected resources that could be accessed if the request token was authorized, and
(iii) information about the operations that could be carried out on protected resources if the request token was authorized.

Sub-step s22 of extracting information from the message may include parsing the message.

The second sub-step s24 consists in determining whether to prevent the request token from being forwarded to the service provider 400 based on whether the extracted information meets policy settings. If the extracted information does not meet policy settings stored in, or accessible by, the controller 100, the controller 100 prevents the request token from being forwarded to the service provider 400.

FIGS. 5a to 6b show some network configurations wherein embodiments of the invention may be applied. Although only one consumer 300 and one service provider 400 are shown in each of FIGS. 5a to 6b, more than one service provider 400 and more than one consumer 300 may be provided. Likewise, although only one user terminal (or US) 200 is illustrated as interacting with the other components of the network, more than one user terminal 200 may be involved.

The user terminal 200 and the controller 100 may communicate so that the controller 100 is capable of making information available to the user terminal 200. In response, the user terminal 200 may adapt the policy settings used by the controller 100 to control messages arriving from the consumer 300. Setting, by a user through its user terminal 200, policy settings in the controller 100 may be implemented using a graphical user interface generated on a computer display (such as on the UE 200), so that a user may interact with the user terminal 200 to set the policy settings. The controller 100 acts as a privacy delegate for the user.

The consumer 300, or consumer web applications, and the service provider 400, or service web applications (which may also be called containers), illustrated in FIGS. 5a to 6b generally do not trust each other at least initially or as a default behaviour. The consumer 300 and the service provider 400 do not follow a federated, centralized approach.

Figure 5A:
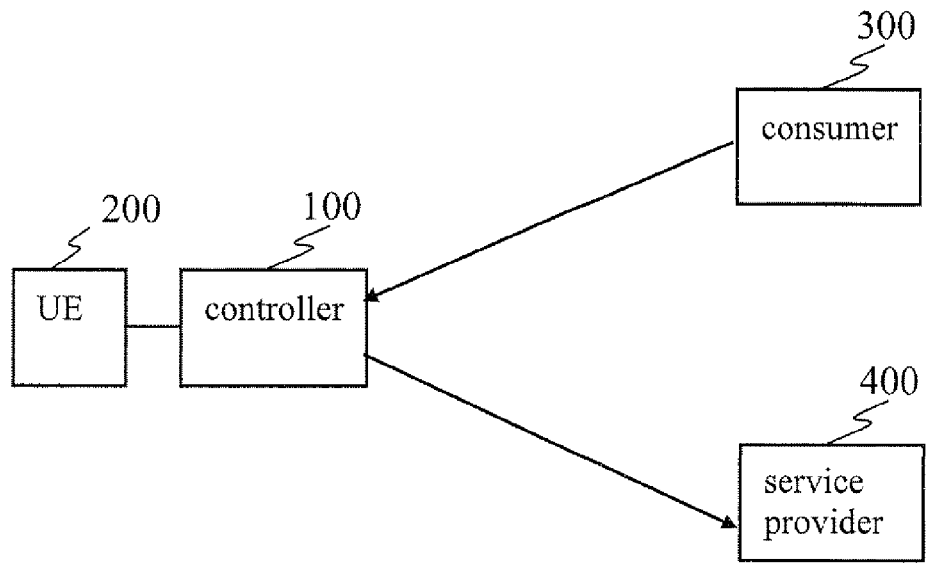
FIGS. 5a, 5b and 5c schematically illustrate three network configurations in the context of which methods in embodiments of the invention may be carried out.

FIG. 5a schematically illustrates a network configuration in one embodiment of the invention, wherein the controller 100 and the user terminal 200 are separate physical entities. The user terminal 200 is capable of communicating with the controller 100. Upon receiving a message including a request token from a consumer 300, the controller 100 determines whether the message meets policy settings governing the access to protected resources. A message that does not meet the policy settings is prevented from being forwarded to the service provider 400. In contrast, a message that meets the policy settings may be forwarded to the service provider 400. In such a manner, the policy settings are enforced.

Figure 5B:
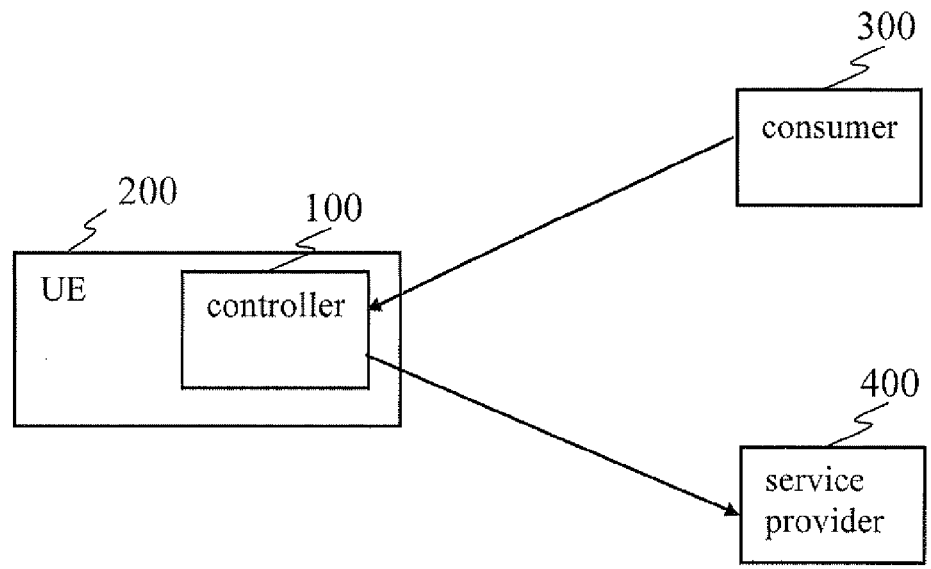

FIG. 5b schematically illustrates a network configuration in one embodiment of the invention, wherein, in addition to the steps described with reference to FIG. 5a, the controller 100 runs on the user equipment 200, or user terminal 200.

Figure 5C:
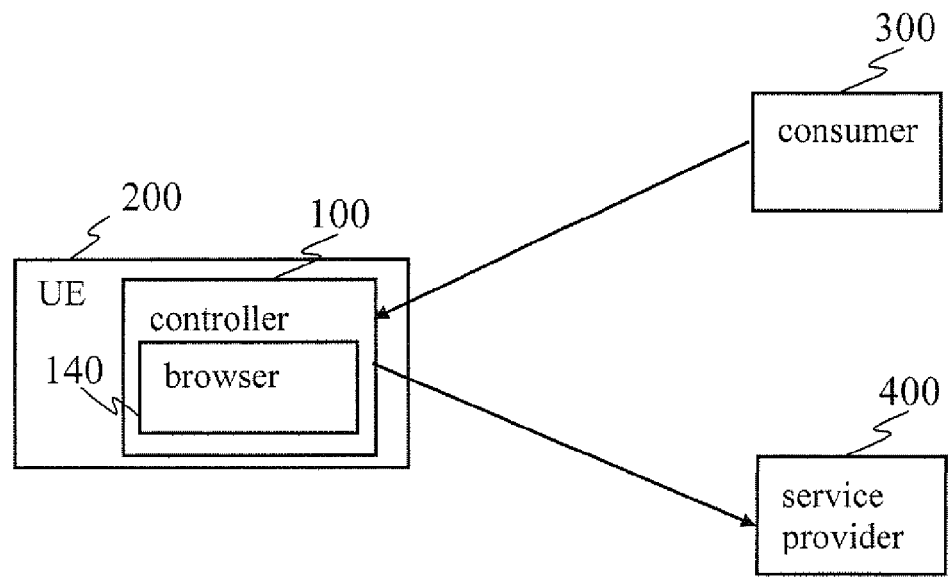

FIG. 5c schematically illustrates a network configuration in one embodiment of the invention, wherein the user terminal 200 has a web browser 140 running thereon. The operations of the browser 140 are controlled at least to a certain extent by the controller 100. The controller 100 is depicted in FIG. 5c as including the browser 140, but the controller 100 may also run concurrently to the browser 140 to control to flow of messages and requests reaching the browser 140. In one embodiment, the controller 100 is implemented using a browser add-on.

A message originating from the consumer 300 is received by the controller 100. The message includes a request to redirect (or to direct, which is synonymous here) the user terminal's web browser to the address of the service provider 400 associated with the request token. The controller 100 determines whether the redirect request should be prevented from being accepted based on the policy settings governing the access to protected resources. The consumer 300 first transmits the message to the controller 100 and then, depending on the determination made by the controller 100, the controller 100 may forward the request token to the service provider 400.

In that respect, FIG. 5c also schematically illustrates a system including a controller 100 and a user terminal 200 capable of communicating with the controller 100, wherein the user terminal 200 is configured to run a web browser; and the message includes a request to redirect (or to direct) the user terminal's web browser to the address of the service provider 400 associated with the request token.

Figure 6A:
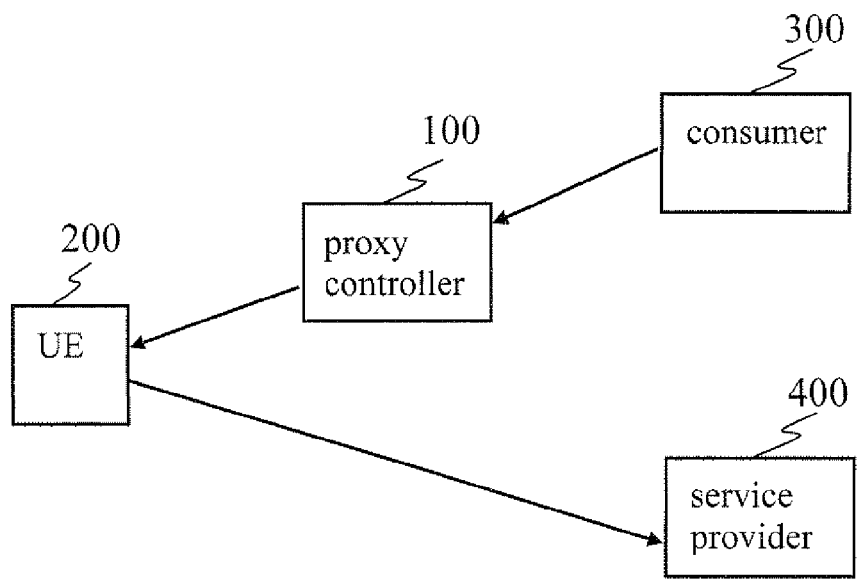
FIGS. 6a and 6b schematically illustrate two network configurations in the context of which methods in embodiments of the invention may be carried out, with the two network configurations including each a so-called proxy controller.

FIG. 6a schematically illustrates a network configuration in one embodiment of the invention, wherein the controller 100 is a proxy controller 100. Upon receiving the message from the consumer 300, if it is determined that the message meets policy settings, the message and its request token is forwarded to the user terminal 200. Otherwise, the message is not forwarded to the user terminal 200, so that the request token is later prevented from being forwarded by the user terminal 200 to the service provider 400 associated with the request token. In other words, the controller 100, by blocking the message when determined to be necessary in accordance with the policy settings, prevents the request token from being forwarded by the user terminal 200 to the service provider 400.

Figure 6B:
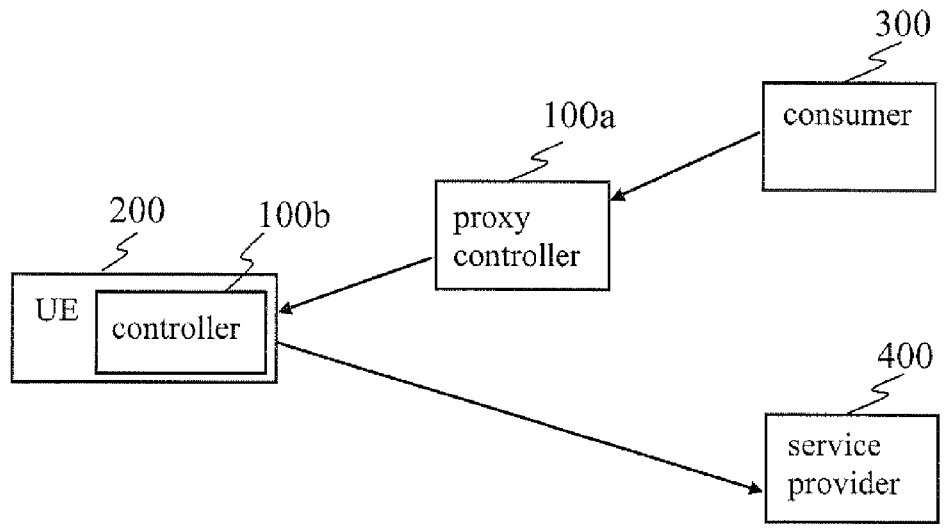

FIG. 6b schematically illustrates a network configuration in one embodiment of the invention, including two controllers, i.e. a proxy controller 100a and a controller 100b running on the user terminal 200. Upon receiving a message from a consumer 300 by the proxy controller 100a, the proxy controller 100a determines whether the message meets policy settings. If the message meets the policy settings, the message and its request token are forwarded to the user terminal 200 which hosts the controller 100b. Otherwise, the message is not forwarded to user terminal 200 and controller 100b, so that the request token is prevented from being forwarded by user terminal 200 and controller 100b to the service provider 400 associated with the request token.

When the message and its request token are forwarded to user terminal 200 hosting controller 100b, controller 100b performs a second interception and examination of the message based on policy settings which are proper to controller 100b.

In the network configuration of FIG. 6b, proxy controller 100a may for instance be managed by a local network administrator, and the other controller 100b hosted on the user terminal 200 may be for instance managed by the user itself. Here, managing a controller means being able to at least set the policy settings applicable to the controller.

Figure 7:
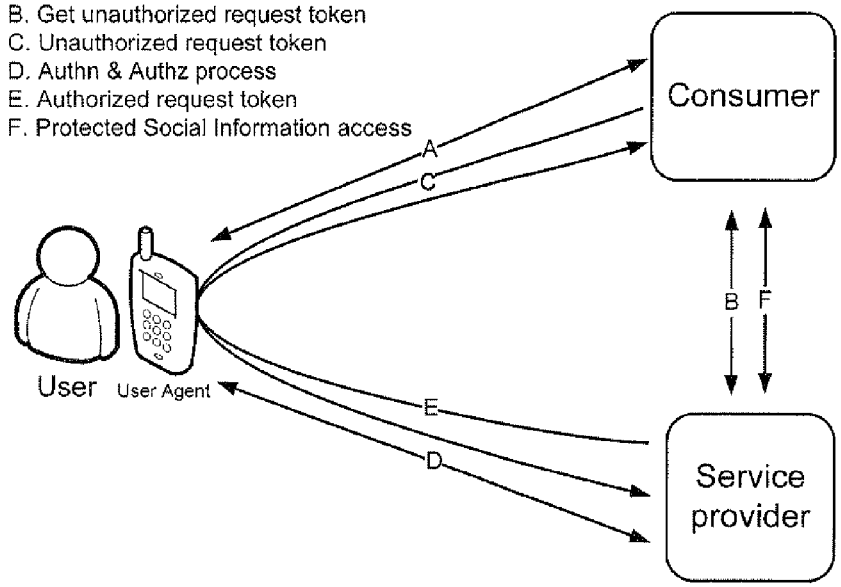
FIG. 7 schematically illustrates a network configuration only to better understand the background of the invention and some problems addressed by embodiments of the invention.

FIG. 7 schematically illustrates an authentication and authorization process according to the OAuth protocol, for illustrating the background of the invention in more details and for better understanding some of the problems solved by the invention. The invention is however not limited to its application to the OAuth protocol.

The OAuth protocol enables a consumer application (illustrated by the box labelled "Consumer" on FIG. 7) to access protected resources from a service provider (illustrated by the box labelled "Service provider" on FIG. 7) without requiring users to disclose their service provider credentials at the consumer. The OAuth protocol uses tokens generated by the service provider instead of the user's credentials in the requests for protected resources. The process uses two token types: request tokens and access tokens. Request tokens are used by the consumer to ask the user to authorize access to the protected resources. The authorized request token is then exchanged for an access token. Access tokens are used by the consumer to access the protected resources on behalf of the user.

Still with reference to FIG. 7, first, a user triggers the authorization process somehow (step A), for example by visiting an illustrative printer.consumer.com website (the consumer) by means of his or her user agent. The authorization process then comprises three consecutive steps:

(1) The consumer obtains an unauthorized request token from the service provider (step B).

(2) The user authorizes the request token using his or her user agent. To do so, first, the consumer sends to the user agent an unauthorized request token that the user agent forwards to the service provider (step C). Then, the service provider begins an authentication procedure with the user (step D) through the user agent. If the authentication procedure is successful, the service provider authorizes the request token and provides the user agent with an authorized request token (step B), which the user agent forwards back to the consumer. If the authentication procedure is unsuccessful, the service provider may inform the consumer that the request token has been revoked, when forwarding the response through the user agent.

(3) Finally, the consumer exchanges with the service provider the authorized request token for an access token (step F) in order to subsequently access the user's protected resources from the service provider.

In accordance with the OAuth protocol, privacy management is handled by users themselves. Users authorize consumers to access protected resources of a service provider. Once the authorization is given, the consumer gets an access token to access to the protected resources. It has notably been recognized by the inventors that, although the OAuth protocol does not specify any restrictions on how long an access token is valid, should the token be valid for a short amount of time, authorizations would then need to be given every time the consumer needs an access to a protected resource. This need to repeatedly request an authorization may be cumbersome.

Furthermore, it has also been notably recognized by the inventors that the OAuth protocol does not consider any method for enabling users to control in a fine-grained manner the access rights granted to a consumer. Instead, the users grant or deny access to all their protected resources in a service provider to a given consumer.

Furthermore, it has been further recognized by the inventors that users are not aware of which protected resources are actually requested by the consumer. Once the consumer is authorized, the request for accessing the protected resources is a direct communication between the consumer and the service provider (step F in FIG. 7), and users have no means to know which protected resources are being used and have been used.

Users could set their privacy settings in each single service provider that stores protected resources associated with the users' identity. However, the privacy settings would then need to be explicitly stated in a per service provider basis, if ever possible.

Figure 8:
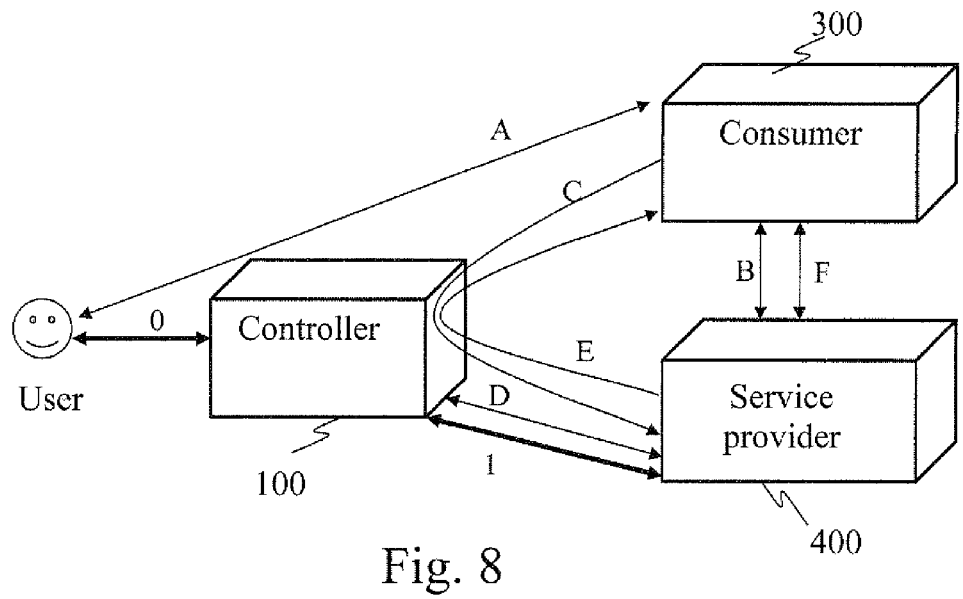
FIG. 8 is a diagram of a method in one embodiment of the invention.

FIG. 8 schematically illustrates a network configuration in one embodiment of the invention, as well as the communication flows that are involved in carrying out this embodiment.

The double-headed arrow "1" illustrates the retrieval, by the controller 100, of information about the presence of protected resources in a service provider 400. This is the so-called static view retrieval, which will be explained in more details with reference to FIG. 9. Once the controller 100 is authenticated by the service provider 400, the controller 100 queries the service provider 400 for obtaining information about the protected resources associated with a given user.

Figure 9:
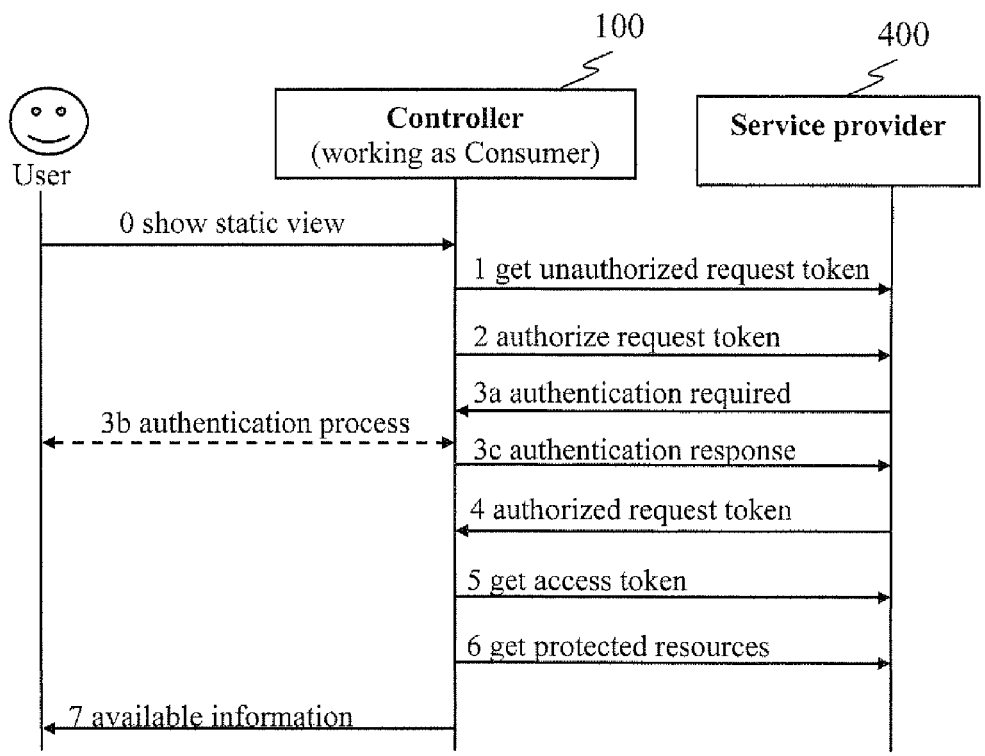
FIG. 9 is a diagram of a method in one embodiment of the invention, especially showing the use of a controller as a consumer to obtain information about protected resources accessible from a service provider.

FIG. 9 illustrates the static view retrieval, which forms one embodiment of the invention. In this embodiment, the controller 100 may act, or work, as an OAuth consumer 300, if the OAuth protocol is used. To this end, the controller 100 may have been previously registered as a consumer 300 in the target service provider 400. During the registration process, the service provider 400 provides the controller 100 with a consumer key and a consumer secret. These elements are useful for future communications between the controller 100 and the service provider 400, and may be generated just once for each service provider 400 that the controller 100 wants to query (not in a per-user basis).

Once the controller 100 is registered in a service provider 400, the user may use the controller 100 to retrieve a static view of the protected resources stored about the user (the protected resources associated with the user's identity) in the service provider 400 (step 0, arrow labelled "show static view"). The controller 100 starts by getting an unauthorized request token from the service provider 400 (step 1, "get unauthorized request token"). Then, the authorization process begins (step 2, "authorize request token"). During this authorization process, the service provider 400 requires that the user be authenticated (step 3$a$, "authentication required"). To this end, the controller 100 acts as a user proxy. The controller 100 first requests the credentials to the user (step 3$b$, "authentication process") and then forwards the user's credentials back to the service provider 400 (step 3$c$, "authentication response"). At the end of this authorization process, the controller 100 receives the authorized request token (step 4, "authorized request token"), that the controller 100 exchanges for a valid access token (step 5, "get access token").

The controller 100 uses the access token to access, at the service provider 400, the protected resources accessible at the service provider 400 (step 6, "get protected resources"). Once the service provider 400 releases this information, the controller 100 presents it to the user (step 7, "available information").

In one embodiment, the user may be offered the opportunity to carry out further management operations on the protected resources, such as adding, updating and deleting information.

The "static view retrieval" embodiment illustrated in FIG. 9 may be used in the context of OpenSocial and OAuth protocols. OpenSocial provides a set of application programming interfaces (API) to help web-based social networking applications to share their social data and is maintained by the OpenSocial Foundation based in San Francisco, U.S. (see also http://www.opensociai.org/) The OpenSocial Specification v0.9 is available, as of October 2009, on http://www.opensocial.org/Technical-Resources/opensocial-spec-v09/OpenSocial-Specification.html.

Steps 1, 2, 3, 4 and 5 (illustrated in FIG. 9) may follow the OAuth protocol (ref. [2]). However, in order to avoid repetitive requirements for the user to authenticate against each service provider 400 (step 3$b$), the controller 100 may store the user's credentials at each service provider 400 that keeps or maintains user's protected resources. This advantageously provides a single sign-on procedure. Step 6 may also follow the protocol described in. OpenSocial Specification v0.9.

Figure 10:
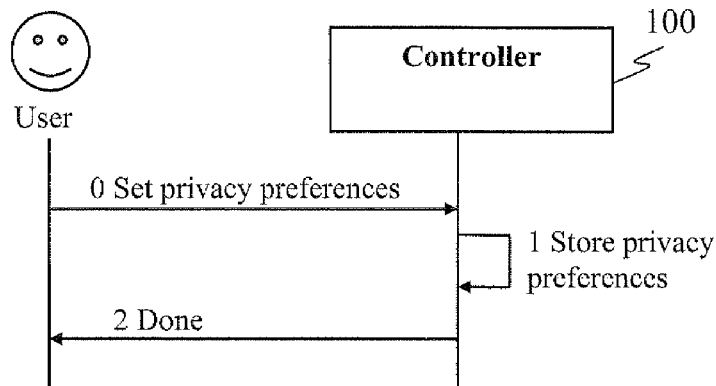
FIG. 10 is a diagram of a method in one embodiment of the invention, especially showing the operation of setting policy settings governing the access to protected resources in a controller.

FIG. 10 schematically illustrates the management of privacy settings by a user, or user terminal, in a controller 100, in one embodiment of the invention. In particular, communications that may be involved in the privacy settings management are illustrated.

A user wishes to set privacy preferences to govern the use and release of his or her protected resources. The controller 100 shows different options to the user and allows him or her to configure different parameters such as the conditions under which the protected resources can be accessed, i.e. used or released. When done, the controller 100 stores the resulting policy settings. Afterwards, whenever a consumer 300 requires authorization to access the protected resources, the controller 100 enforces the user's preferences, i.e. the policy settings.

Users benefit from being able to set their preferences regarding access to their protected resources. To this end, users set privacy preferences in the controller 100 and, afterwards, the controller 100 enforces these privacy preferences.

The variables that participate in the definition of the policy settings may include: requestor, resource, operation and permission. The user may not need to be explicitly stated in the policy settings, since the user is the user of the controller 100. The user may however be mentioned.

The requestor may be any consumer 300 trying to gain access to the user's protected resources.

The resource may be the identifier of the protected resources concerned by the policy settings rule. For instance, OpenSocial defines specific formats for standard protected resources such as people and activities. If a static view of a service provider 400 is retrieved, the controller 100 may use this information to reduce the possible values associated with the resource and thus provide finer-grained policies.

The operation values may be the operations that any consumer 300 can request, for example, in the example of OpenSocial they may be "query", "create" and "delete". The embodiment of the invention is not limited however to any number or type of operations that may be the subject to policy settings rules.

The permission may be set to "grant", "deny" or "askMe" (when the user prefers to decide on a per invocation basis; this can be implemented by means of an ad-hoc interaction service e.g. pop-ups in a browser, SMS-based authorization, etc.) In order to improve the usability of the solution, some options (wildcards) may also introduced: "all possible values", "none" or a "specific user-selected subset".

These values are set by the user and submitted to the controller 100 (FIG. 10, step 0, "Set privacy preferences"). As a result, a new policy settings rule referring to a user and his or her protected resources is created and stored in the controller 100 (step 1, "Store privacy preferences"). The policy settings process may be enhanced with the specification of further conditions upon which the information can be released.

Users may be provided with the opportunity to express their privacy preferences through different means. First, the users may choose one out of several pre-defined privacy policies and associate it to a protected resource. These pre-defined privacy policies may be described in natural language so that non-technically skilled users can understand them. This natural language description is mapped to a specific policy implementation described in a privacy policy expression language. These policies are hierarchical so that it is easier for users to compare among them and choose the one that better suits their needs. The approach benefits from the simplicity and usability of the model because users do not have to deal with the policy details.

Users may also be allowed to define each detail of the privacy policy. Although this approach provides greater flexibility in the description of users preferences, it may cause some risks for the usability. Just advanced users may understand (and probably wish to know) the meaning of the policy. This may be offered as an advanced option.

The enforcement of privacy policies in one embodiment of the invention will now be explained with reference to FIG. 11.

A consumer 300 wants to access a protected resource. The protected resource is governed by policy settings set by the user within the controller 100. The controller 100 enforces the policy settings, thus indirectly deciding whether the consumer 300 will be able to receive back the authorized token that would allow the consumer 300 to access the protected resource from the service provider 400.

The consumer 300 may be working on behalf of the user. Thus, there may be an HTTP connection already established between both.

The consumer 300 starts the process by getting an unauthorized request token from the service provider 400 that hosts the protected resources (FIG. 8, arrow labelled "B"). Some implementations of this step are defined in OpenSocial and OAuth specifications.

Figure 11:
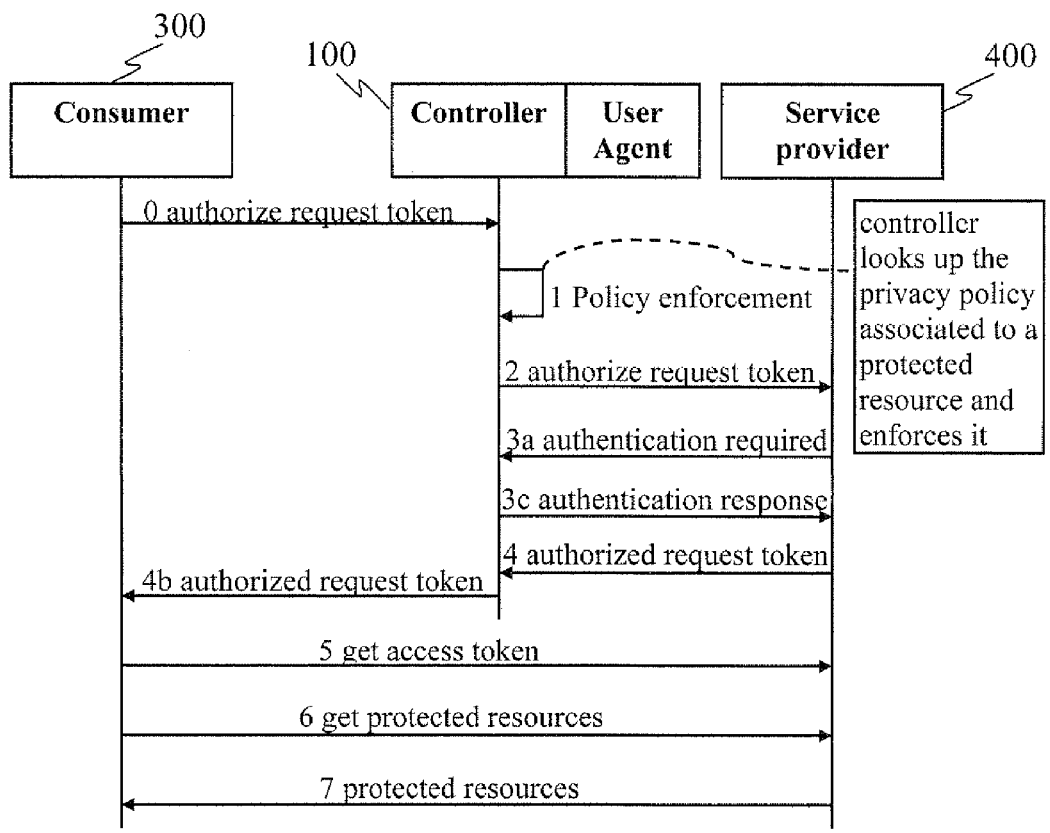
FIG. 11 is a diagram of a method in one embodiment of the invention, especially showing the operation of carrying out an authorization procedure initiated by a consumer to access protected resources from a service provider.

Now turning to FIG. 11, the consumer 300 begins the OAuth authorization process. First, the consumer 300 sends to the user agent (the user agent may for instance be a browser on the operational environment on which the controller 100 may be executed) an HTTP message redirecting the user agent to the service provider 400 for authorization (step 0, "authorize request token"). The controller 100 catches, or in other words intercepts, this message and extracts some relevant information for policy enforcement (step 1, "Policy enforcement"). Notably (the following is a non-exhaustive list) the requester, or consumer identifier, may be extracted from the OAuth parameter named oauth_callback, if the OAuth protocol is used. The OAuth protocol does not define how to retrieve other information, namely the protected resources and the operation, in relation to which the consumer 300 wants an authorization. However, OAuth protocol states that additional parameters may be defined by the service provider 400.

An embodiment of the invention takes advantage of this possibility to define two new parameters that all OAuth authorization messages would include: oauth_requested_resource and oauth_requested_operation. If these parameters are not included in the authorization request, the controller 300 may assume that the consumer 300 tries to query, modify and delete all the protected resources which are accessible at the service provider 400. The controller 300, based on this assumption, may therefore enforce the policy settings accordingly.

Once the policy settings have been enforced and the result of the enforcement has been "allow" (i.e., "allow to forward"), the controller 100 goes on with the process. Namely, the controller 100 forwards the original "authorize" request token message to the service provider 400 (step 2, "authorize request taken"). Then, the service provider 400 starts the authentication procedure with the user through his or her user agent (step 3a, "authentication required"). In this context, authentication is the process of confirming the asserted identity of a user with a specified, or understood, level of confidence.

At that stage, in one embodiment, the controller 100 catches the message again. Since the credentials needed for the authentication may have been stored in the scenario of "static view retrieval", step 3b (including getting the user's credentials at the service provider 400, see FIG. 9) is not needed unless the user has explicitly stated that he or she must be asked for consent.

The controller 100 sends the authentication response (step 3c, "authentication response"). As a result, the service provider 400 sends back the authorized request token (step 4, "authorized request token") and the controller 100 forwards it to the consumer 300 (step 4b, "authorized request token"). The consumer 300 may then exchange the authorized request token for an access token at the service provider 400 and then gain access to the protected resources and operation needed (steps 5, 6 and 7).

If the result of the enforcement process (step 1) is "deny", the controller 100 may return a message back to the consumer 300 informing the consumer 300 about the denial or about the details of the denial.

The process described with reference to FIG. 11 may be based on the OAuth protocol (ref. [1]), as follows.

In one embodiment, the users and their user agents are proxied by the controller 100. That is, the users and their user agents do not receive any notification of authentication when a request from a consumer 300 is received. The authorization process is implicit. The user-defined policy settings are applied by the controller 100 without intervention from the user.

In one embodiment, an extension to the OAuth protocol is made. Namely, two additional parameters, oauth_requested_resource and oauth_requested_operation (naturally, these parameters may be given other names), may be included in every request for authorization, i.e. in every message including a request token. The OAuth protocol allows for these extensions.

Once a user, or a controller 100 on behalf of the user, authorizes a request token, the request token can be exchanged for an access token. The access token grants the consumer 300 privileges to perform operations on protected resources associated with the user and accessible from the service provider 400.

If the extension to the OAuth protocol defined in the previous embodiment is implemented, with the consumers 300 therefore declaring in the request token (using additional parameters) which information and operations are requested, the OAuth protocol may also be extended, in one embodiment, in such a manner that service providers 400 grant to consumers 300 privileges only for what the consumers 300 declared in their original request for authorization. This provides consistency and trust in the authorization process.

In one embodiment, the service providers 400 inform the consumers 300 of the protected resources that the consumers 300 are authorized to gain access to. The service providers 400 inform the consumers 300 using additional parameters sent while releasing the access token.

Figure 12:
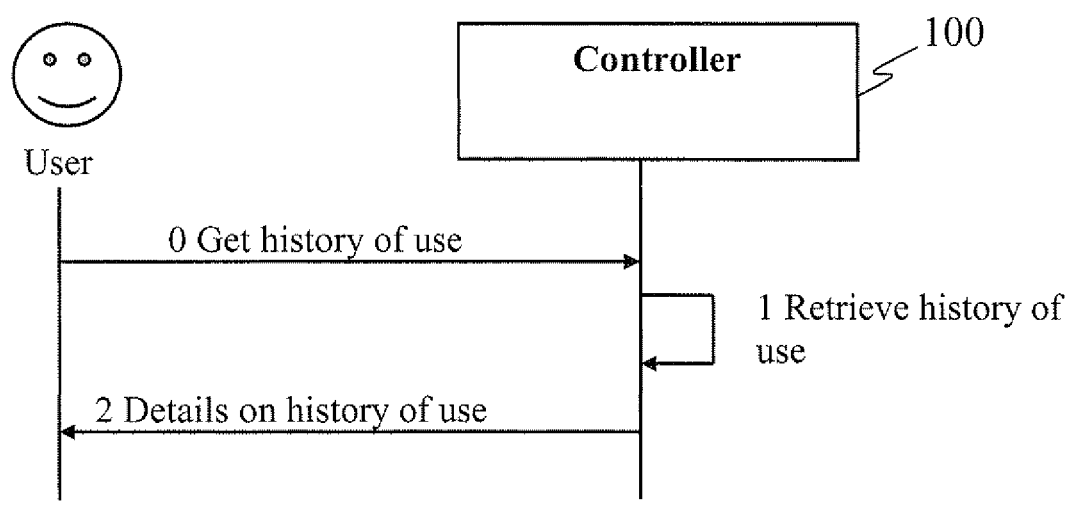
FIG. 12 is a diagram of a method in one embodiment of the invention, especially showing the operation of obtaining history of use of protected resources from a controller.

In one embodiment described with reference to FIG. 12, a dynamic view retrieval capability is implemented. Let us assume that a controller 100 has retrieved a static view of the protected resources of a user in a service provider 400.

Let us further assume that a consumer 300 has tried to gain access to some protected resources associated with the user. Now, the user wants to know the usage history of some of the protected resources associated with him or her. To this end, the user sends a request to the controller 100 (step 0, "Get history of use"). The controller 100 retrieves the requested data (step 1, "Retrieve history of use"), which is then presented to the user (step 2, "Details on history of use").

The dynamic view retrieval capability may be enabled as follows. Whenever a consumer 300 requests access to protected resources associated with a user, this event is logged by the controller 100. The controller 100 may log this information after the controller 100 has enforced the policy settings. Thus, the information regarding the outcome of the policy enforcement may be added to the log. This information may be used, for example, for future audits.

The information presented may include details about the protected resources requested, timestamp of access, service provider 400 that stored the information, consumer 300 that has accessed the information, and outcome of the policy enforcement. The information may be extracted from the different parameters included in the message sent by the consumer 300. Further information may be presented if available such as the privacy promises made by the consumer 300 or conditions imposed by the service provider 400 upon releasing the information.

The physical entities according to the invention, including the controllers, service providers, consumers and user terminals may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "receiver", "determiner", "forwarder", "obtainer", "recorder", and "publisher" are used herewith, no restriction is made regarding how distributed these elements may be and regarding how gathered elements may be. That is, the constituent parts of these elements may be distributed in different software or hardware components or devices for bringing about the intended function. A plurality of distinct elements may also be gathered for providing the intended functionalities.

Any one of the above-referred elements of a controller may be implemented in hardware, software, field-programmable gate array (FPGA), application-specific integrated circuit (ASICs), firmware or the like. The same applies to user terminals, consumers and service providers.

In further embodiments of the invention, any one of the above-mentioned receiver, determiner, forwarder, obtainer, recorder, and publisher may be replaced by receiving means, determining means, forwarding means, obtaining means, recording means and publishing means, respectively, or by a receiving unit, a determining unit, a forwarding unit, an obtaining unit, a recording unit and a publishing unit respectively, for performing the functions of the receiver, determiner, forwarder, obtainer, recorder, and publisher.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method carried out by a controller, the method comprising:
    receiving a message including a request token, wherein
        a request token is a value used by a consumer to request authorization from a user to access protected resources from a service provider, without using user credentials for the service provider;
        a service provider is at least one of a software application and a web site that is configured to provide access to protected resources; and
        a consumer is at least one of a software application and a web site that is configured to access a service provider on behalf of a user, without knowing the user credentials for the service provider;
    determining whether the message meets policy settings governing the access to protected resources; and
    preventing the request token from being forwarded to the service provider associated with the request token in accordance with determination that the message does not meet the policy settings.

2. The method of claim 1, further comprising:
    allowing the request token to be forwarded to the service provider associated with the request token in accordance with determination that the message meets the policy settings.

3. The method of claim 1, wherein determining whether the message meets the policy settings further includes:
    extracting from the message at least one of:
        information about the consumer from which the request token originates;
        information about the protected resources on which one or more operations are requested to be authorized by means of the request token; and
        information about the one or more operations which are requested to be authorized by means of the request token; and
    determining whether the extracted information meets the policy settings.

4. The method according to claim 1, further comprising:
    obtaining, from at least one service provider, information regarding the protected resources associated to an identity of a user in the at least one service provider.

5. The method of claim 4, wherein the information regarding the protected resources associated to the identify of the user in the at least one service provider includes information regarding the usage of the protected resources associated to the identify of the user in the at least one service provider.

6. The method according to claim 1, further including:
    recording information, here referred to as history information, regarding at least one of:
        received messages and whether associated request tokens have been prevented from being forwarded;
        received request tokens and whether respective request tokens have been prevented from being forwarded;
        received messages and whether associated request tokens have been allowed to be forwarded; and
        received request tokens and whether respective request tokens have been allowed to be forwarded; and
    making the history information available to a user terminal.

7. The method according to claim 1, additionally carried out by a user terminal capable of communicating with the controller, the method further including:
    setting, by the user terminal, the policy settings in the controller.

8. A non-transitory computer readable storage medium storing instructions for execution by a processing system of a controller that includes at least one processor, the stored instructions comprising instructions that are, when executed by the processing system, configured to execute the method according to claim 1.

9. A controller comprising:
    a receiver configured to receive a message including a request token, wherein:
        a request token is a value used by a consumer to request authorization from a user to access protected resources from a service provider, without using user credentials for the service provider;
        a service provider is at least one of a software application and a web site that is configured to provide access to protected resources; and
        a consumer is at least one of a software application and a web site that is configured to access a service provider on behalf of the user, without knowing the user credentials for the service;

a determiner configured to determine whether the message meets policy settings governing access to protected resources; and a forwarder configured to prevent the request token from being forwarded to the service provider associated with the request token if the message is determined to not meet the policy settings.

10. The controller of claim 9, wherein the forwarder is further configured
to allow the request token to be forwarded to the service provider associated with the request token if the message is determined to meet the policy settings.

11. The controller of claim 9, wherein the determiner is further configured to:
extract, from the message, at least one of:
information about the consumer from which the request token originates;
information about the protected resources on which one or more operations are requested to be authorized by means of the request token; and
information about the one or more operations which are requested to be authorized by means of the request token; and
determine whether the extracted information meets the policy settings.

12. The controller according to claim 9, further including:
an obtainer configured to obtain, from at least one service provider, information regarding the protected resources associated to a user identity in the at least one service provider.

13. The controller of claim 12, wherein the information regarding the protected resources associated to the user identity in the at least one service provider includes information regarding the usage of the protected resources associated to the user identity in the at least one service provider.

14. The controller according to claim 9, further including:
a recorder configured to record information, here referred to as history information, regarding at least one of:
received messages and whether associated request tokens have been prevented from being forwarded;
received request tokens and whether the request tokens have been prevented from being forwarded;
received messages and whether associated request tokens have been allowed to be forwarded; and
received request tokens and whether the request tokens have been allowed to be forwarded; and a publisher configured to make available the history information to a user terminal.

15. A system comprising:
a controller according to claim 9, and
a user terminal configured to communicate with the controller,
wherein the user terminal is configured to set the policy settings in the controller.

16. A controller for facilitating access to protected resources of a service provider, which are associated with a user of the service provider, for a consumer without using credentials of the user, the controller comprising:
a receiver configured to receive a message that includes a request token from the consumer, wherein:
a request token includes a value used by the consumer to request authorization to access service provider protected resources associated with the user, where granting authorization to access service provider protected resources is accomplished without using user credentials for the user of the service provider;
a service provider includes at least one of a software application and a web site that is configured to provide access to the service provider protected resources; and
a consumer includes at least one of a software application and a web site that is configured to access a service provider without knowledge of the credentials for the user, wherein the consumer does not know the user credentials for the user of the service provider; and
a processing system including at least one processor, the processing system configured to:
determine whether the message meets policy settings governing access to the service provider protected resources associated with the user;
prevent the request token from being forwarded to the service provider associated with the request token if the message is determined to not meet the policy settings; and
forward the request token to the service provider associated with the request token if the message is determined to meet the policy settings without using the user credentials for the user of the service provider.

* * * * *

UNITED STATES PATENT AND TRADEMARK OFFICE
CERTIFICATE OF CORRECTION

PATENT NO. : 8,595,494 B2
APPLICATION NO. : 13/501582
DATED : November 26, 2013
INVENTOR(S) : Monjas Llorente et al.

It is certified that error appears in the above-identified patent and that said Letters Patent is hereby corrected as shown below:

On the Title Page, Item (73), under "Assignee", in Column 1, Line 1, delete "Ericsson," and insert -- Ericsson (publ), --, therefor.

On the Title Page, Item (57), under "ABSTRACT", in Column 2, Line 7, delete "{300}" and insert -- (300) --, therefor.

On Title Page 2, in Item (56), under "OTHER PUBLICATIONS", in Column 1, Line 9, delete "et a.," and insert -- et al., --, therefor.

In the Specification

In Column 10, Line 8, delete "(or US)" and insert -- (or UE) --, therefor.

In Column 12, Line 13, delete "(step B)," and insert -- (step E), --, therefor.

In Column 13, Line 44, delete "http://www.opensociai.org/) The" and insert -- http://www.opensocial.org/). The --, therefor.

In Column 13, Line 55, delete "in. OpenSocial" and insert -- in OpenSocial --, therefor.

In Column 15, Line 23, delete "requester," and insert -- requestor, --, therefor.

In Column 15, Line 46, delete "taken")." and insert -- token"). --, therefor.

In the Claims

In Column 18, Line 27, in Claim 5, delete "identify" and insert -- identity --, therefor.

In Column 18, Line 30, in Claim 5, delete "identify" and insert -- identity --, therefor.

Signed and Sealed this
Fifteenth Day of July, 2014

Michelle K. Lee
*Deputy Director of the United States Patent and Trademark Office*